United States Patent
Kutsen

(10) Patent No.: US 9,187,158 B2
(45) Date of Patent: Nov. 17, 2015

(54) UNIVERSAL ADJUSTABLE MARINE DECK FILL LID KEY

(71) Applicant: Gregory Kutsen, Seabrook, TX (US)

(72) Inventor: Gregory Kutsen, Seabrook, TX (US)

( * ) Notice: Subject to any disclaimer, the term of this patent is extended or adjusted under 35 U.S.C. 154(b) by 69 days.

(21) Appl. No.: 13/740,387

(22) Filed: Jan. 14, 2013

(65) Prior Publication Data

US 2014/0196574 A1    Jul. 17, 2014

(51) Int. Cl.
- *B67B 7/00* (2006.01)
- *B67B 7/04* (2006.01)
- *B63B 69/00* (2013.01)
- *B60K 15/04* (2006.01)

(52) U.S. Cl.
CPC .............. *B63B 69/00* (2013.01); *B60K 15/0406* (2013.01); *B60K 2015/0438* (2013.01)

(58) Field of Classification Search
USPC ............ 81/3.09, 3.48, 3.15, 3.25, 3.27; 7/151
See application file for complete search history.

(56) References Cited

U.S. PATENT DOCUMENTS

| | | | | |
|---|---|---|---|---|
| 441,979 | A * | 12/1890 | Shaughnessy et al. | 7/166 |
| 761,523 | A * | 5/1904 | Miller | 81/176.2 |
| 1,384,705 | A * | 7/1921 | Meyer | 81/176.3 |
| 1,579,992 | A * | 4/1926 | Altman | 81/176.15 |
| 4,796,495 | A * | 1/1989 | Schar | 81/490 |
| 4,870,737 | A * | 10/1989 | Navarro | 29/227 |
| 6,480,140 | B1 * | 11/2002 | Rosefsky | 342/14 |
| 7,143,491 | B2 * | 12/2006 | Wood | 29/275 |
| 7,188,578 | B2 * | 3/2007 | DeRosa | 114/203 |
| 7,971,329 | B1 * | 7/2011 | Brohard | 29/275 |

\* cited by examiner

*Primary Examiner* — Monica Carter
*Assistant Examiner* — Danny Hong

(57) ABSTRACT

A universal adjustable deck fill lid key may comprise a handle and a slide, the handle and the slide each mounting one small pin and one large pin, and the slide being slidably mounted on the handle in a manner that enables a user to position the slide along the handle such that either the small pins or the large pins may engage the holes of a two-hole deck fill lid to enable the key to remove or re-install the deck fill lid in a wrench-like manner. In one embodiment, the universal deck fill lid key may additionally incorporate a slot head to enable the key to interface with and operate a slotted deck fill lid. In another embodiment, the universal deck fill lid key may additionally incorporate a drive nut to enable the key to interface with and operate a socket deck fill lid.

11 Claims, 10 Drawing Sheets

UNIVERSAL ADJUSTABLE MARINE DECK FILL LID KEY

FIELD OF THE INVENTION

The present invention relates generally to the field of marine deck fills. More particularly, the present invention provides a useful and novel apparatus for removing and re-installing the lids of marine deck fills.

BACKGROUND OF THE INVENTION

Unless specifically indicated otherwise, the materials described in this section are not prior art to the claims in this application, and are not admitted to be prior art by inclusion in this section.

The material in this patent document is subject to copyright protection under the copyright laws of the United States and other countries. The copyright owner grants a limited license to any member of the public to reproduce the patent document as it appears in official governmental records. All other copyrights rights are reserved.

A marine deck fill is a sealable port, typically mounted into the deck or hull of a marine vessel, that functions to accommodate access to fill the marine vessel's fuel or water tanks, and to seal the access when the filling function is complete. Typically, a marine deck fill may comprise a port and a lid. The port may be installed into a deck or hull. The lid may be removed from the port to perform the filling function, may be reinstalled into the port to seal the port when the filling function is complete. The lid may have a feature to accommodate removal and re-installation of the lid. Typically, the feature may be a slot, a pair of holes, or a socket receiver.

A marine deck fill lid is removed and re-installed with the use of a tool called a marine deck fill lid key, which may be designed to interface with a slot or a hole pair, depending upon which type of marine deck fill the key is designed for. The key may be used in a wrench-like manner to rotate the lid for removal and re-installation. Where the marine deck fill lid incorporates a socket receiver, a winch handle may be used to remove the marine deck fill lid.

In addition to being designed with various removal and re-installation features (holes, slots, or socket receivers), marine deck fills may be designed in a variety of sizes. For example, the diameters of the hole pairs and the dimension between hole pairs vary from design to design. Typical, a conventional deck lid key is designed for use with a particular deck lid configuration. The specialized design of these conventional deck lid keys constitutes a limitation of the usefulness of the conventional deck lid keys in that a different specialized key must be used to remove or re-install the lid of each marine deck fill.

Attempts have been made to design an adjustable deck fill lid key. Each suffers from one or more of the following limitations: lack of structural integrity, pinch hazards, incompatibility with all deck fill lid designs, and ergonomic deficiencies.

What is needed is a sturdy, adjustable deck fill lid key that is designed to interface with a variety of deck fill lid designs and sizes, including slotted, two-hole, and socket receiver designs, that eliminates pinch hazards, and that provides an ergonomically-correct grip.

SUMMARY OF THE INVENTION

In view of the foregoing limitations and disadvantages inherent to the conventional apparatus in the related art, the present invention provides a useful and novel apparatus [hereinafter "universal adjustable deck fill lid key"] for removing and re-installing marine deck fill lids.

A principal object of the present invention is to provide a deck fill lid key that is designed to interface with a variety of deck fill lid designs and sizes.

In one aspect, the present invention may comprise a handle and a slide mounted on the handle, the handle and the slide each mounting one small pin and one large pin, and the slide being slidably mounted on the handle in a manner that enables a user to position the slide along the handle such that either the small pins or the large pins may engage the holes of a two-hole deck fill lid to enable the universal deck fill lid key to remove or re-install the deck fill lid in a wrench-like manner. The universal deck fill lid key may additionally incorporate a slot head to enable the key to interface with and operate a slotted deck fill lid. The universal deck fill lid key may further additionally incorporate a drive nut to interface with and operate a deck fill lid that features a socket receiver.

Additional objectives of the present invention are to provide a deck fill lid key that is sturdy, that eliminates pinch hazards, and that provides an ergonomically-correct grip.

In one aspect, the present invention may comprise a handle and a slide mounted on the handle, the handle and slide being designed, configured and sized to provide a firm, comfortable, and ergonomically-correct grip. Additionally, in exemplary embodiments of the present invention, the slide may be locked in position on the handle to eliminate pinch hazards. Further, the handle and the slide may be designed, configured, sized and made of appropriate materials to ensure that the deck fill lid key of the present design is sufficiently sturdy for its intended use.

An additional, but optional, further object of the present invention is to provide a multi-use tool that may perform additional marine-related functions beyond the primary function of removing and re-installing deck fill lids.

In one aspect of the present invention, the handle of the adjustable deck fill lid key may define one or more slots passing through the handle, the one or more slots designed and configured to engage the head of a shackle bolt to enable the adjustable deck fill lid key to function as a tool to loosen and/or tighten a shackle bolt.

Other objects, aspects and advantages of the present invention will become readily apparent to those with skill in the art from the following figures, descriptions and claims. As will be appreciated by those with skill in the related art, the invention may be implemented in a plurality of equivalent embodiments. Such alternative embodiments, and their attendant objects, aspects and advantages, are within the scope of the present invention and, therefore, the examples set forth herein shall not be limiting.

BRIEF DESCRIPTION OF THE DRAWINGS

The nature of this invention, as well as all its objects, aspects and advantages, will become readily apparent and understood upon reference to the following detailed description when considered in conjunction with the accompanying drawings, in which like reference numerals designate like parts throughout the figures thereof, and wherein.

DETAILED DESCRIPTION OF THE INVENTION

The following description is provided to enable a person skilled in the relevant art to make and use the invention, and sets forth the best modes contemplated by the inventor of carrying out the invention. The present invention shall not be limited to the examples disclosed. Rather, the scope of the invention shall be as broad as the claims will allow.

Various inventive features are described below that may each be used independently of one another or in combination with other features. However, any single inventive feature may not address any of the disadvantages or objects discussed above, or might address only one of the disadvantages or objects discussed above. Further, one or more of the disadvantages or objects discussed above may not be fully addressed by any of the features described below.

Figure 1A:
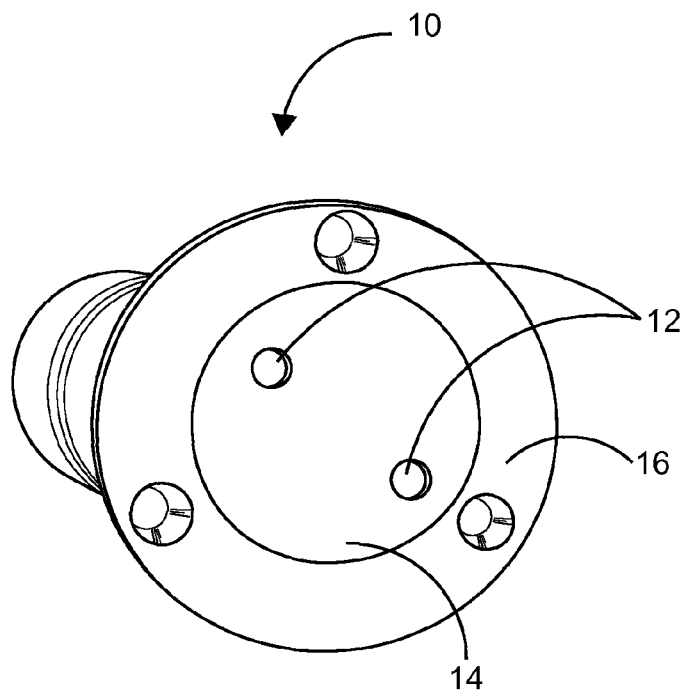
FIG. 1A presents a perspective view of a two-hole deck fill 10, according to existing conventional art.

Referring now to the drawings, FIGS. 1A, 1B, 2A, 2B, 3A, 3B, 4 and 5 provide an understanding of the conventional art. FIG. 1A presents a perspective view of a two-hole deck fill 10, according to existing conventional art. The two-hole deck fill port 16 may be installed into a deck or hull to provide access to a fuel or water tank. The two-hole deck fill lid 14 may be removed from the two-hole deck fill port 16 to access the tank, and re-installed to seal the opening to the tank. The two-hole deck fill lid 14 may have two holes 12 into which the teeth of a deck fill lid key may be inserted to enable the deck fill lid key to remove or re-install the two-hole deck fill lid 14 in a wrench-like manner.

Figure 1B:
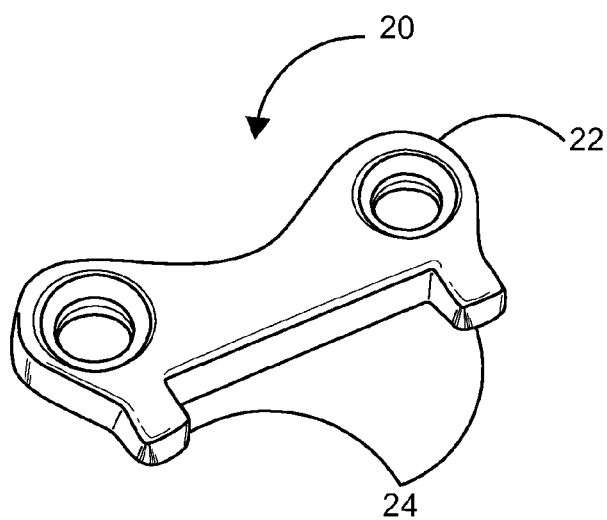
FIG. 1B presents a perspective view of a two-hole deck fill lid key 20, according to existing conventional art.

FIG. 1B presents a perspective view of a two-hole deck fill lid key 20, according to existing conventional art. The two-hole deck fill lid key 20 may comprise a handle 22 and two teeth 24. The teeth 24 may be configured to engage the two holes 12 of the two-hole deck fill lid 14. The conventional two-hole deck fill lid key 20 is not adjustable, and is designed for use only with a deck fill having a particular hole diameter and spacing. Further, this conventional two-hole deck fill lid key 20 is not designed to interface with deck fill lids of other designs, such as a slotted deck fill lid 34, presented in FIG. 2A, or a socket deck fill lid 54, presented in FIG. 3A.

Figure 2A:
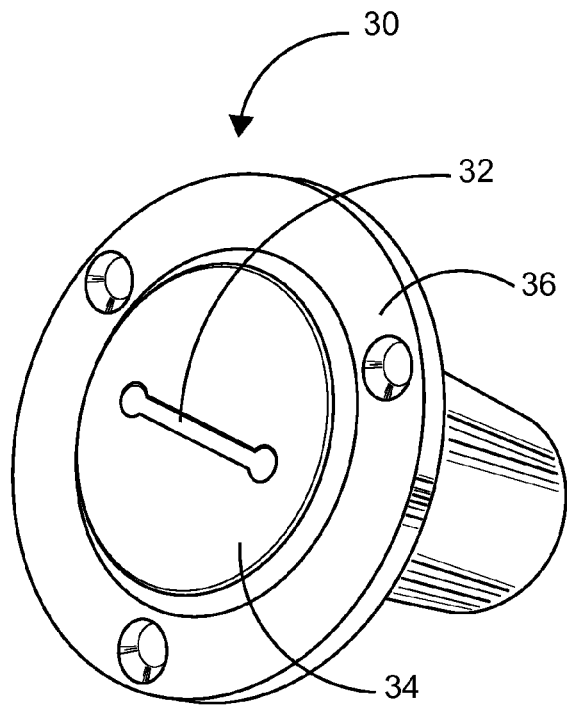
FIG. 2A presents a perspective view of a slotted deck fill 30, according to the existing conventional art.

FIG. 2A presents a perspective view of a slotted deck fill 30, according to the existing conventional art. The slotted deck fill port 36 may be installed into a deck or hull to provide access to a fuel or water tank. The slotted deck fill lid 34 may be removed from the slotted deck fill port 36 to access the tank, and re-installed to seal the opening to the tank. The slotted deck fill lid 34 may have a slot 32 into which the slot head of a slotted deck fill lid key may be inserted to enable the slotted deck fill lid key to remove or re-install the slotted deck fill lid 34 in a wrench-like manner.

Figure 2B:
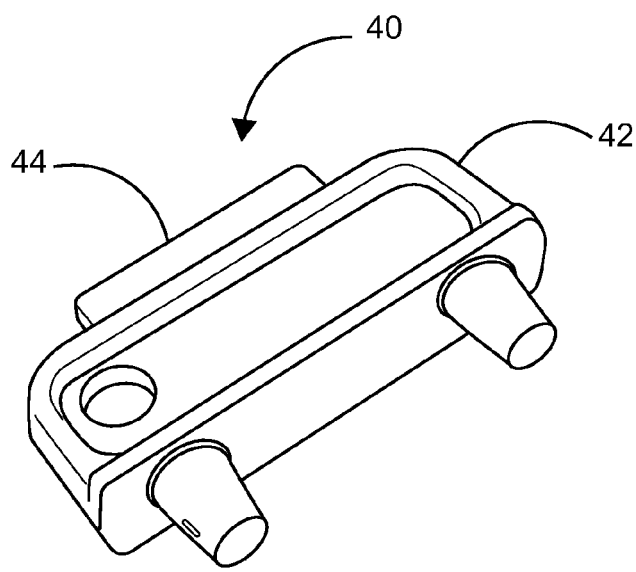
FIG. 2B presents a perspective view of a slotted deck fill lid key 40, according to the existing conventional art.

FIG. 2B presents a perspective view of a slotted deck fill lid key 40, according to the existing conventional art. The slotted deck fill lid key 40 may comprise a handle 42 and a slot head 44. The slot head 44 may be configured to engage the slot 32 of the slotted deck fill lid 34.

Figure 3A:
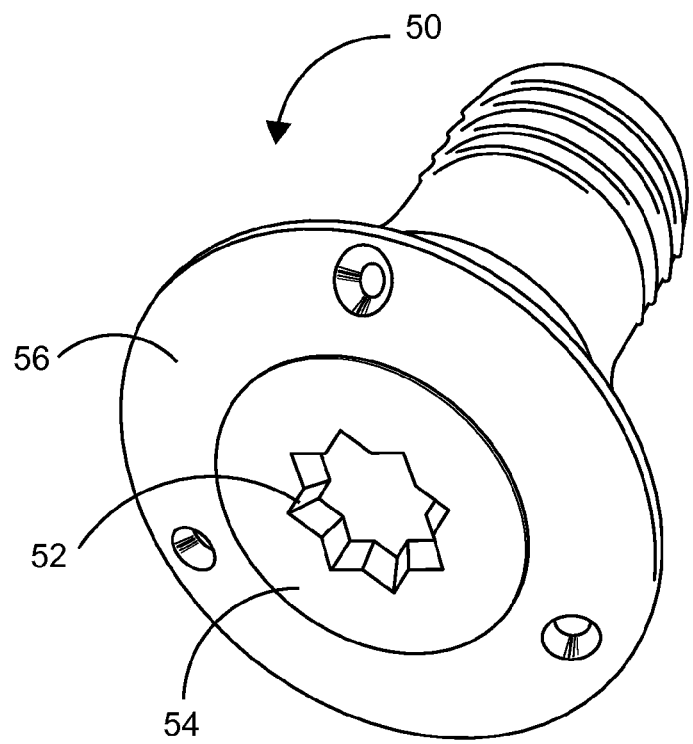
FIG. 3A presents a perspective view of an socket deck fill 50, according to the existing conventional art.

FIG. 3A presents a perspective view of a socket deck fill 50, according to the existing conventional art. The socket receiver deck fill port 56 may be installed into a deck or hull to provide access to a fuel or water tank. The socket deck fill lid 54 may be removed from the socket receiver deck fill port 56 to access the tank, and re-installed to seal the opening to the tank. The socket deck fill lid 54 may have a socket receiver 52 into which the drive nut of a winch handle may be inserted to enable the winch handle to remove or re-install the socket deck fill lid 54 in a wrench-like manner.

Figure 3B:
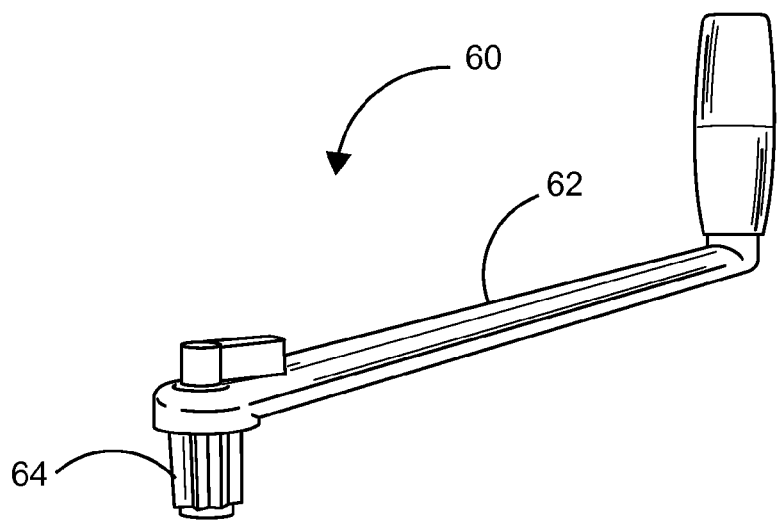
FIG. 3B presents a perspective view of a winch handle 60, according to the existing conventional art.

FIG. 3B presents a perspective view of a winch handle 60, according to the existing conventional art. The winch handle 60 may comprise a handle 62 and a drive nut 64. The drive nut 64 may be configured to engage the socket receiver 52 of the socket deck fill lid 54.

Figure 4:
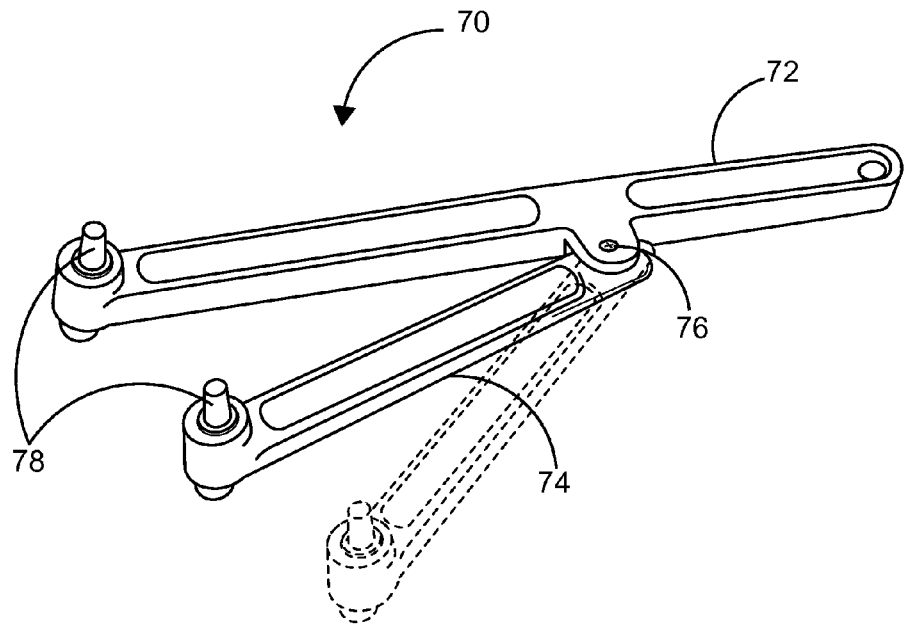
FIG. 4 presents a perspective view of a rotating-arm adjustable deck fill lid key 70, according to the existing conventional art.

FIG. 4 presents a perspective view of a rotating-arm adjustable deck fill lid key 70, according to the existing conventional art. An arm 74 may be rotatably attached to a handle 72 at a pivot 76. Pins 78 may be located near the ends of the arm 74 and the handle 72 furthest from the pivot 76. By rotating the arm 74 about the pivot 76, the distance between the pins 78 may be adjusted for use with two-hole deck fill lids having various distances between the holes in the two-hole deck fill lids. This rotating-arm adjustable deck fill lid key 70 presents a pinch hazard to the user should the user's hand or finger become caught between the arm 74 and the handle 72 if one of the pins 78 disengages from the two-hole deck fill lid hole during use. Additionally, the rotating-arm adjustable deck fill lid key 70 presents a less than optimal ergonomic design in that the user's hand must clumsily grasp both the arm 74 and the handle 72 during use. Further, the rotating-arm adjustable deck fill lid key 70 is not designed to interface with other deck fill lid designs, such as a slotted deck fill lid 34 or socket deck fill lid 54.

Figure 5:
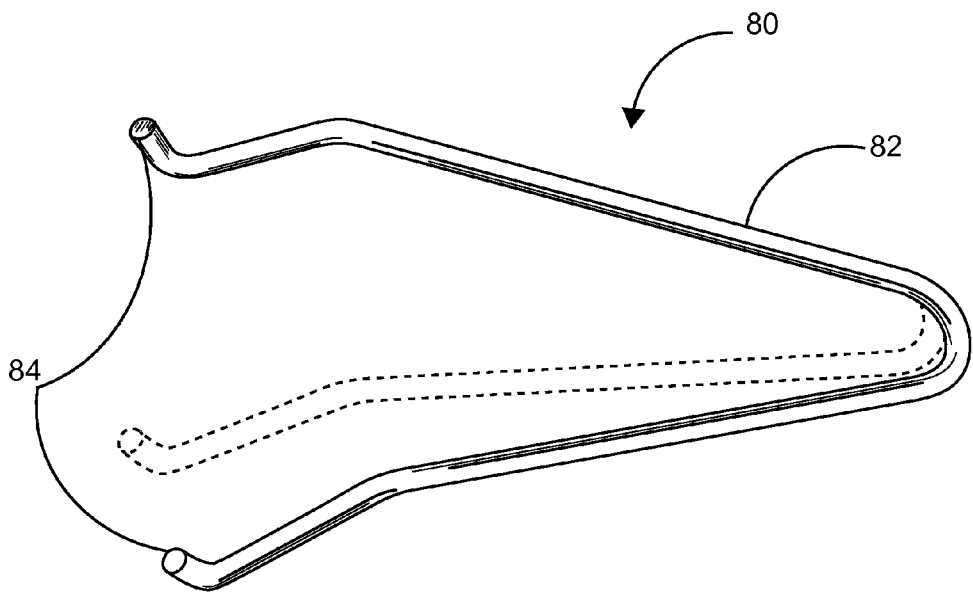
FIG. 5 presents a perspective view of a squeezable handle adjustable deck fill lid key 80 according to the existing conventional art.

FIG. 5 presents a perspective view of a squeezable handle adjustable deck fill lid key 80 according to the existing conventional art. The squeezable handle adjustable deck fill lid key 80 may be constructed of wire formed into a roughly "v" shaped handle 82 having a pin 84 shaped into each end of the handle 82. A user may squeeze the squeezable adjustable deck fill lid key 80 to position the pins 84 for insertion into the holes 12 of a two-hole deck fill lid 14. The flimsy wire construction of the squeezable adjustable deck fill key 80 presents a less-than-optimal ergonomic interface with the user's hand. Additionally, the squeezable adjustable deck fill lid key 80 is not designed to interface with other deck fill lid designs, such as a slotted deck fill lid 34 or socket deck fill lid 54.

Figure 6:
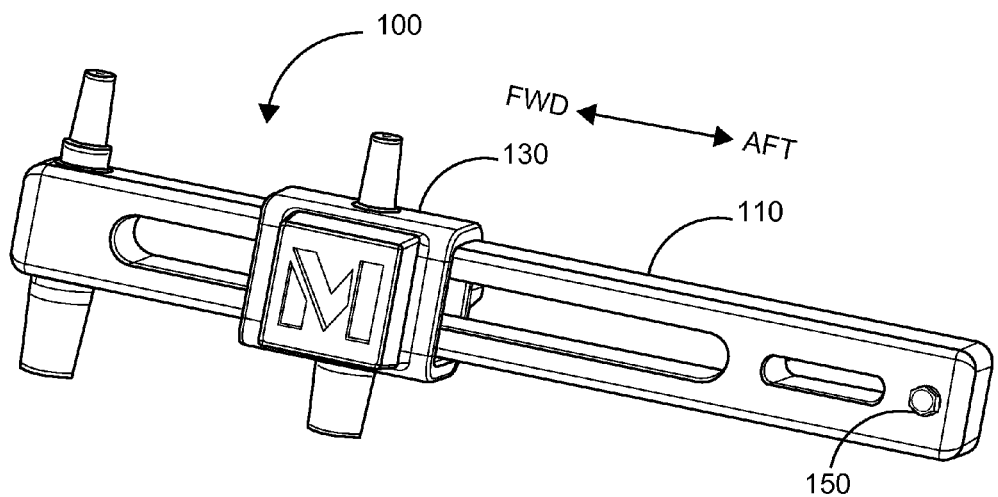
FIG. 6 presents a front perspective view of a universal adjustable deck fill lid key 100, according to one exemplary embodiment of the present invention.

FIG. 6 presents a front perspective view of a universal adjustable deck fill lid key 100, according to one exemplary embodiment of the present invention. The universal adjustable deck fill lid key 100 may comprise a handle assembly 110, a slide 130, and a retaining fastener 150.

Figure 7A:
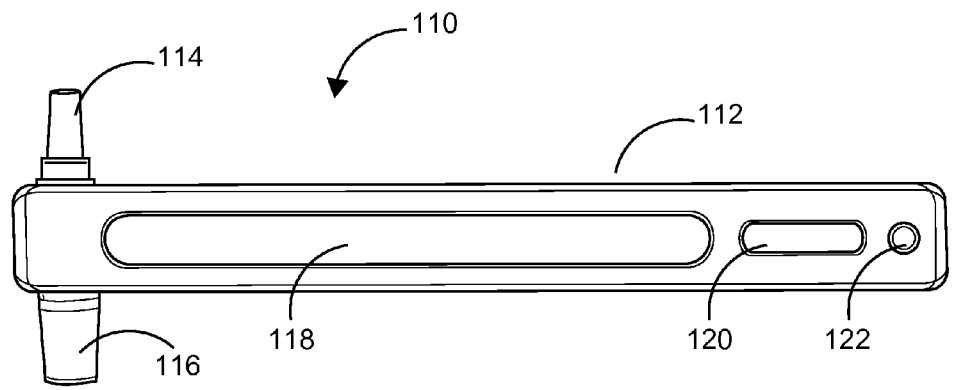
FIG. 7A presents a front view of the handle assembly 110 of the universal adjustable deck fill lid key 100 of FIG. 6.
Figure 7B:
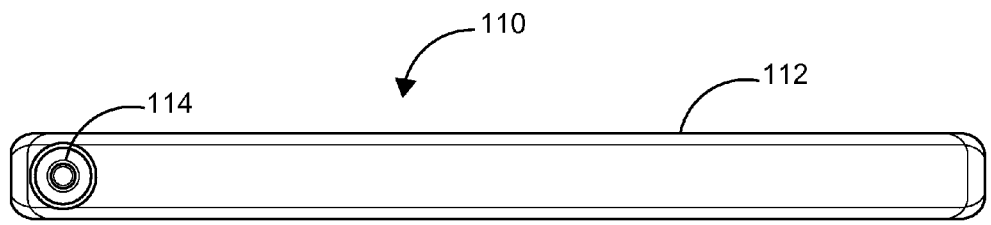
FIG. 7B presents a top view of the handle assembly 110 of the universal adjustable deck fill lid key 100 of FIG. 6.
Figure 8A:
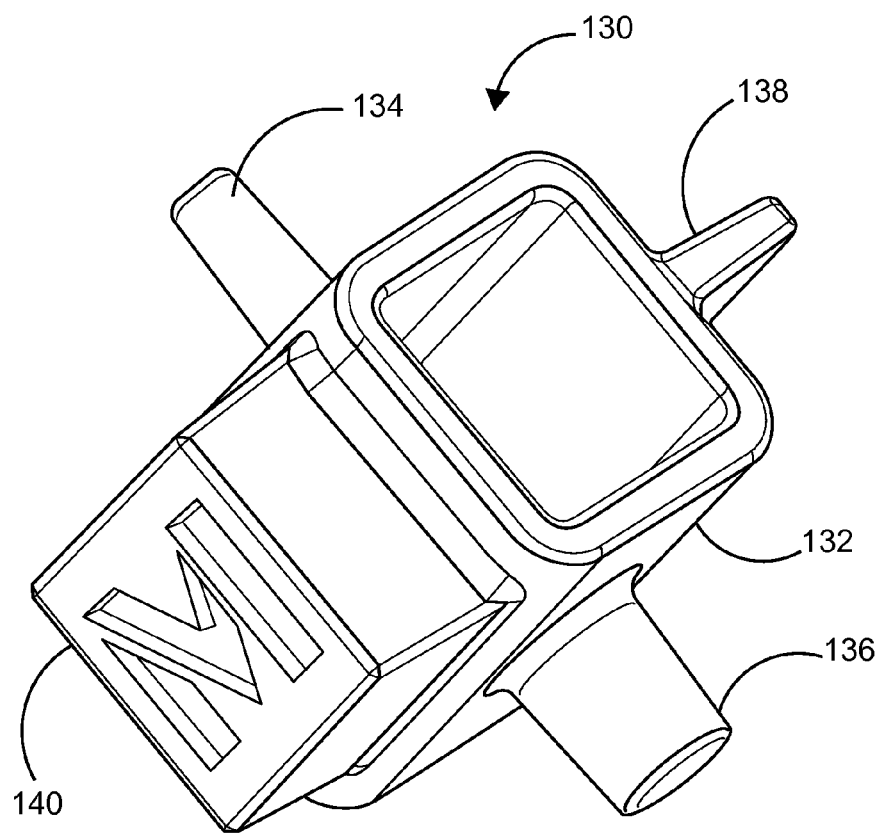
FIG. 8A presents a perspective view of the slide 130 of the universal adjustable deck fill lid key 100 of FIG. 6.
Figure 8B:
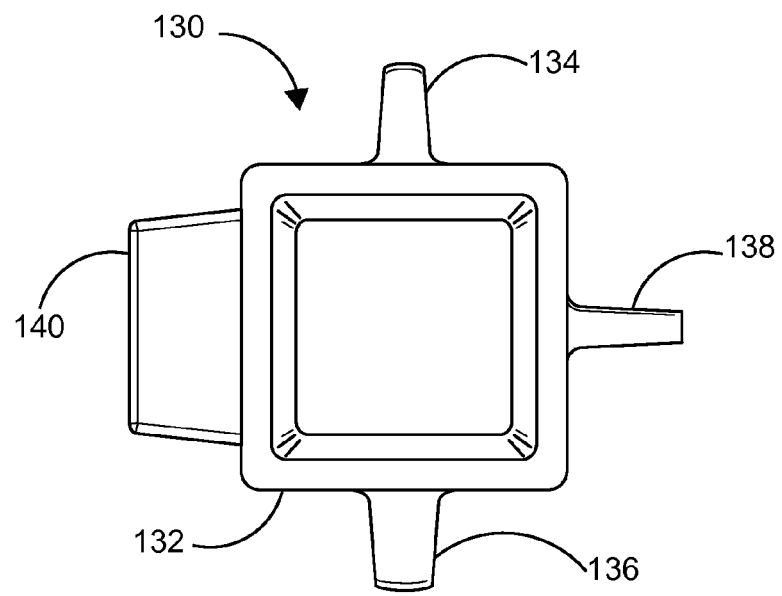
FIG. 8B presents an end view of the slide 130 of the universal adjustable deck fill lid key 100 of FIG. 6.
Figure 9:
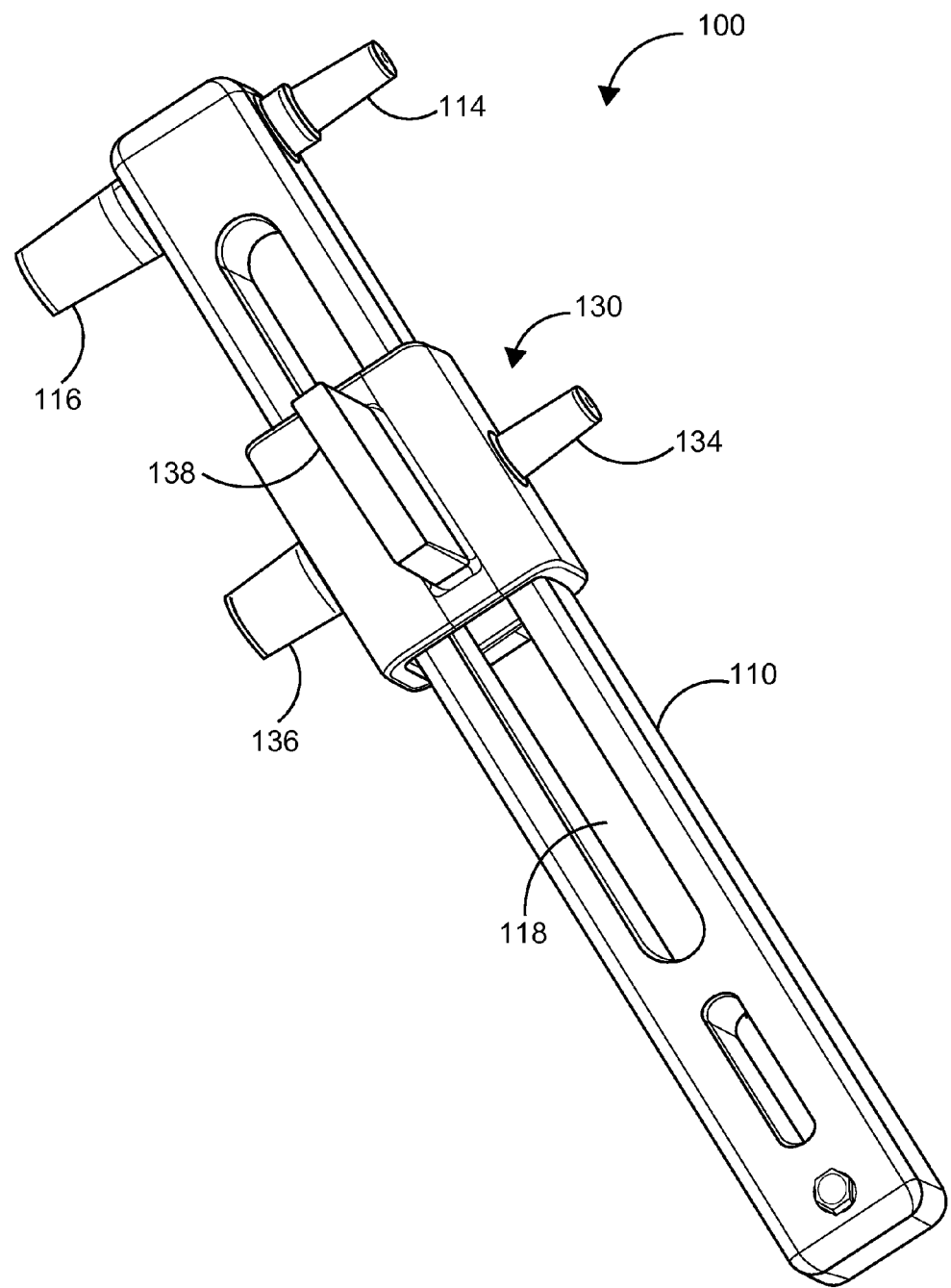
FIG. 9 presents a rear perspective view of the universal adjustable deck fill lid key 100 of FIG. 6.

FIG. 7A presents a front view of the handle assembly 110 of the universal adjustable deck fill lid key 100 of FIG. 6. FIG. 7B presents a top view of the handle assembly 110 of the universal adjustable deck fill lid key 100 of FIG. 6. FIG. 8A presents a perspective view of the slide assembly 130 of the universal adjustable deck fill lid key 100 of FIG. 6. FIG. 8B presents an end view of the slide 130 of the universal adjustable deck fill lid key 100 of FIG. 6. FIG. 9 presents a rear perspective view of the universal adjustable deck fill lid key 100 of FIG. 6.

Figure 10:
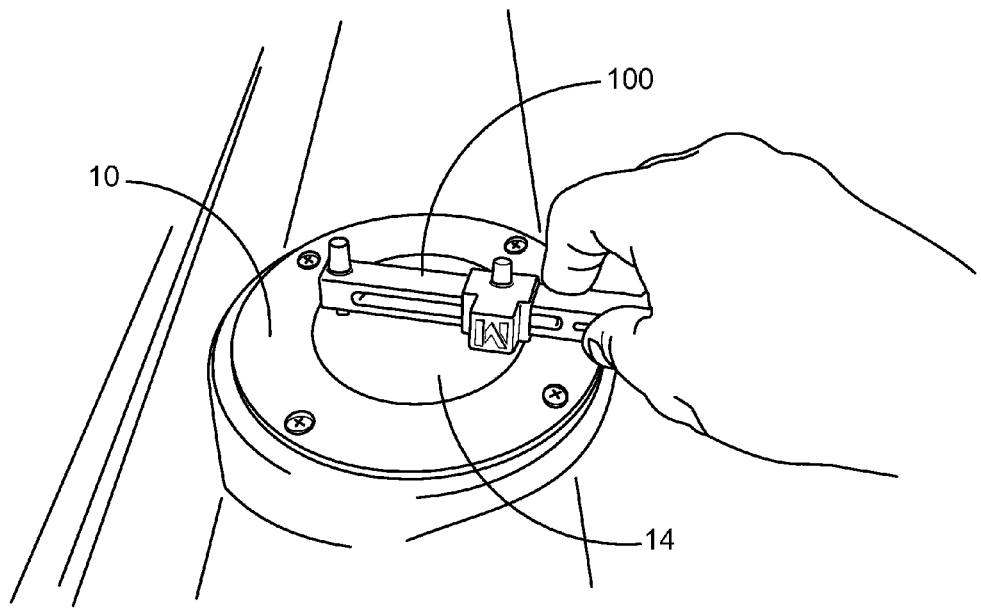
FIG. 10 presents a perspective view illustrating the universal adjustable deck fill lid key 100 of FIG. 6 in use with the two-hole deck fill 10 of FIG. 1A.

The handle assembly 110 may comprise a handle 112, a retainer hole 122, a small pin 114 and a large pin 116. The slide 130 may comprise a slide body 132, a small pin 134, a large pin 136, a slot head 138, and a drive nut 140. The slide 130 may be designed to be slidably mounted on the handle 112 such that the slide 130 may be positioned along the handle 112 as necessary to interface with a particular two-hole deck fill lid 14, as illustrated in FIG. 10. The small pins 114/134 may cooperate to engage the holes 12 of a two-hole deck fill lid 14 with small diameter holes. The large pins 116/136 may cooperate to engage the holes 12 of a two-hole deck fill lid 14 with large diameter holes.

In one embodiment of the present invention, the height of the small pins 114/134 and the large pins 116/136 may be sufficient to allow clearance for the user's fingers when the universal adjustable deck fill lid key 100 is in use.

In another alternative embodiment, the small pins 114/134 and the large pins 116/136 may be tapered along their height to enable the pins 114/134/116/136 to fit into holes having a range of diameters.

In alternative embodiments of the present invention, the small pin 114 and the large pin 116 may be manufactured integrally to the handle 112, or may be separate pieces mechanically attached to the handle 112. Similarly, the small pin 134 and the large pin 136 may be manufactured integrally to the slide body 132, or may be separate pieces mechanically attached to the slide body 132.

Figure 11:
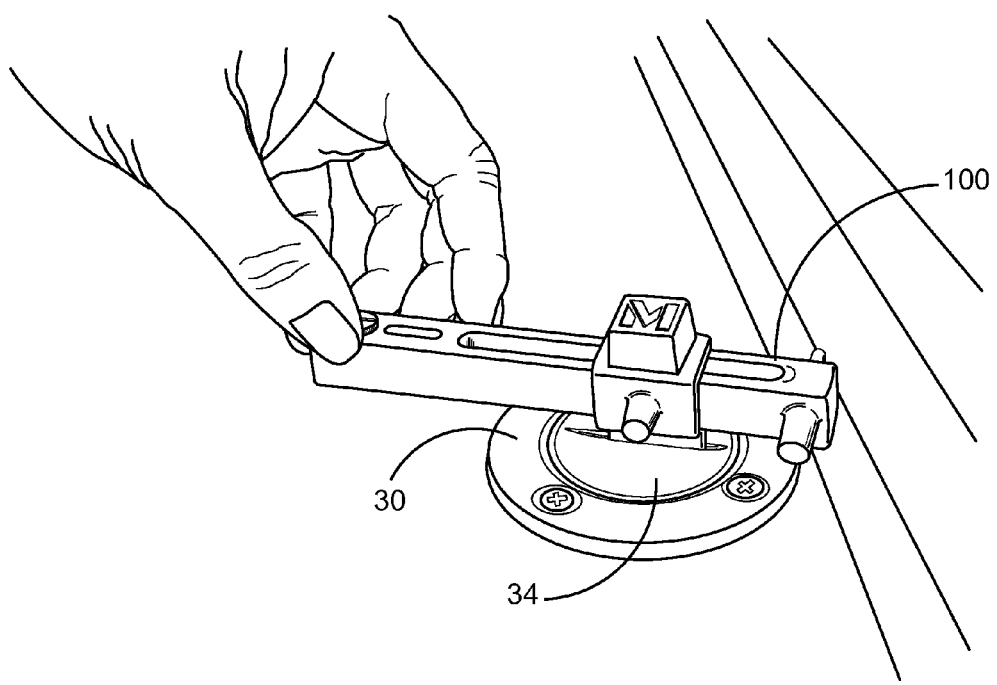
FIG. 11 presents a perspective view illustrating the universal adjustable deck fill lid key 100 of FIG. 6 in use with the slotted deck fill 30 of FIG. 2A.

In one alternative embodiment, the slot head 138 may be designed to engage the slot 32 of a slotted deck fill lid 34 to enable the universal adjustable deck fill lid key 100 to be used to remove and reinstall the slotted deck fill lid 34 of a slotted deck fill 30, as illustrated in FIG. 11.

Figure 12:
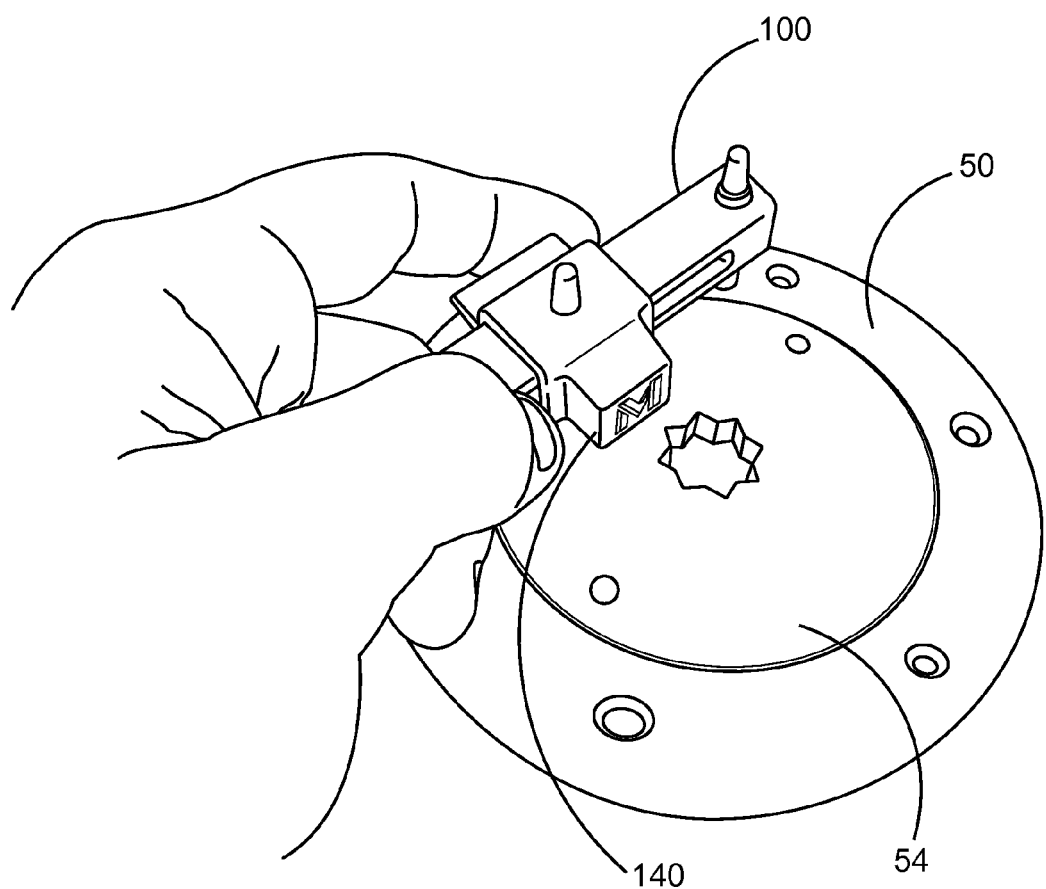
FIG. 12 presents a perspective view illustrating the universal adjustable deck fill lid key 100 of FIG. 6 in use with the socket deck fill 50 of FIG. 4A.

In one exemplary embodiment, the drive nut 140 may be designed to engage the socket receiver 52 of a socket deck fill lid 54 to enable the universal adjustable deck fill lid key 100 to be used to remove and reinstall the socket deck fill lid 54 of a socket deck fill 50, as illustrated in FIG. 12.

In one exemplary embodiment, the universal adjustable deck fill lid key 100 may incorporate a means of preventing the slide 130 from sliding off of the aft end of the handle 112. The means of preventing the slide 130 from sliding off of the aft end of the handle 112 may be a retaining fastener 150, such as a bolt, a screw, or a pin installed into the retainer hole 122 proximal to the aft end of the handle 112.

In alternative embodiments of the present invention, a feature may be added to hold the slide body 132 in a fixed position along the handle 112. This feature may be simply a snug fit between the inner surface of the slide body 132 and the handle 112 or a piece of sheathing material (not shown) attached to the inside surface of the slide body 132. Alternatively, the feature may be a positive locking feature such as a fastener (not shown) such as a set screw, a spring (not shown) that maintains a friction interface between the slide body 132 and the handle 112, or another useful means.

Figure 13:
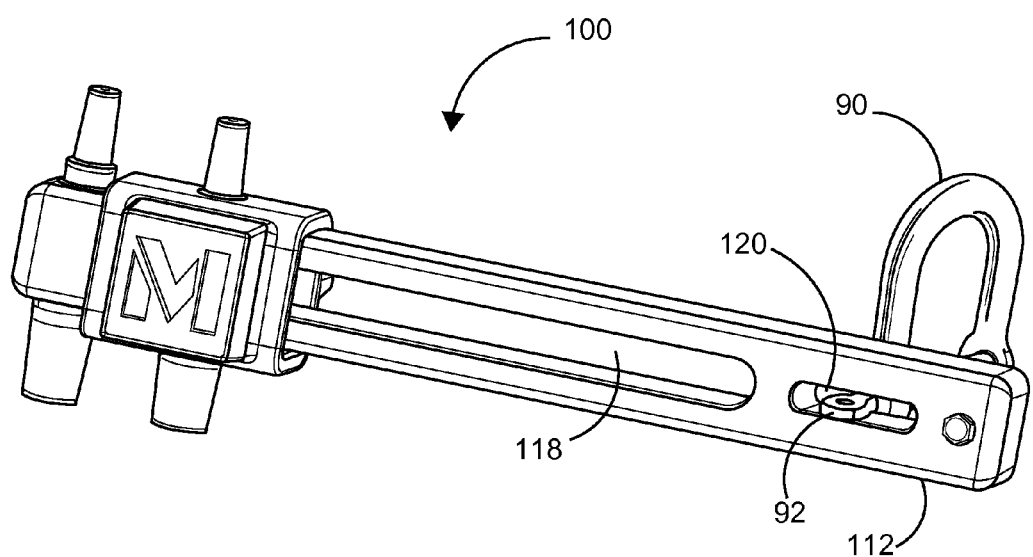
FIG. 13 presents a perspective view illustrating the universal adjustable deck fill lid key 100 of FIG. 6 in use with a shackle 90.

In alternative embodiments of the present invention, one or more slots may be incorporated into the handle 112 of the universal adjustable deck fill lid key 100. In one such alternative embodiment, a small slot 120 may be incorporated into the handle 112, the small slot 120 designed and configured to engage the head of the shackle pin 92 of a shackle 90 to enable the universal adjustable deck fill lid key 100 to function as a tool to loosen and/or tighten the shackle pin 92, as illustrated in FIG. 13. Similarly, a large slot 118 may be incorporated into the handle 112, the large slot 118 designed and configured to engage the head of the shackle pin of a larger shackle (not shown).

The components of the universal adjustable deck fill lid key 100 may be made of any material that is compatible with its intended use, including metal, such as aluminum or galvanized steel, plastic, or a composite material.

As will be appreciated by those with skill in the related arts, the elements of the present invention may be modified, interchanged, separated or combined, or additional elements added without departing from the spirit of the invention. The invention may be practiced in alternative embodiments other than those illustrated in the Figures. Such modifications, combinations, additions and alternatives are within the contemplation of the present invention. The exemplary embodiments and disclosed are not intended to limit the scope of this invention. Accordingly, the scope of the invention should be determined not by the embodiments illustrated, but by their legal equivalents, and shall be as broad as the claims will allow.

What is claimed is:

1. A universal adjustable deck fill lid key, comprising:
   a handle assembly, comprising:
      a handle having a forward end and an aft end, and a generally rectangular cross-section;
      a first small pin mounted perpendicularly onto a first side of said handle, and proximal to said forward end of said handle, said first small pin designed and configured to engage a first small hole in a deck fill lid; and
      a first large pin mounted perpendicularly onto a second side of said handle opposite to said first side of said handle, and proximal to said forward end of said handle, said first large pin designed and configured to engage a first large hole in a deck fill lid; and
   a slide, comprising:
      a slide body, defining a generally rectangular channel through said slide body, said slide body having an internal surface, a first exterior surface, a second exterior surface opposite said first exterior surface, a third exterior surface adjacent to said first exterior surface, and a fourth exterior surface opposite to said third exterior surface, said slide body designed and configured to be slidably mounted over said handle;
      a second small pin mounted perpendicularly onto said first exterior surface of said slide body, said second small pin designed and configured to engage a second small hole in a deck fill lid, and to align with and work in cooperation with said first small pin of said handle to remove or re-install a deck fill lid; and a second large pin mounted perpendicularly onto said second exterior surface of said slide body opposite said first exterior surface of said slide body, said second large pin designed and configured to engage a second large hole in a deck fill lid, and to align with and work in cooperation with said first large pin of said handle to remove or re-install a deck fill lid.

2. The universal adjustable deck fill lid key of claim 1, further comprising a means to prevent said slide from sliding off of the aft end of said handle.

3. The universal adjustable deck fill lid key of claim 2, wherein said means to prevent said slide from sliding off of said aft end of said handle comprises a fastener or a pin proximal to said aft end of said handle.

4. The universal adjustable deck fill lid key of claim 1, further comprising a slot head mounted perpendicularly onto said third exterior surface of said slide body, said slot head designed and configured to engage a slot in a deck fill lid to remove or re-install said deck fill lid.

5. The universal adjustable deck fill lid key of claim 1, further comprising a drive nut mounted perpendicularly onto said fourth exterior surface of said slide body, said drive nut designed and configured to engage a socket receiver in a deck fill lid to remove or re-install said deck fill lid.

6. The universal adjustable deck fill lid key of claim 1, wherein said handle further defines one or more slots passing through said handle, said one or more slots designed and configured to engage the head of a shackle pin of a shackle to enable said universal adjustable deck fill lid key to function as a tool to loosen and/or tighten said shackle bolt.

7. A method of making a universal adjustable deck fill lid key comprising:
   providing a handle assembly, comprising:
      a handle having a forward end and an aft end, and a generally rectangular cross-section;
      a first small pin mounted perpendicularly onto a first side of said handle, and proximal to said forward end of said handle, said first small pin designed and configured to engage a first small hole in a deck fill lid; and
      a first large pin mounted perpendicularly onto a second side of said handle opposite to said first side of said handle, and proximal to said forward end of said handle, said first large pin designed and configured to engage a first large hole in a deck fill lid; and
   providing a slide, comprising:
      a slide body, defining a generally rectangular channel through said slide body, said slide body having an internal surface, a first exterior surface, a second exterior surface opposite said first exterior surface, a third exterior surface adjacent to said first exterior surface, and a fourth exterior surface opposite to said third exterior surface, said slide body designed and configured to be slidably mounted over said handle;
      a second small pin mounted perpendicularly onto said first exterior surface of said slide body, said second small pin designed and configured to engage a second small hole in a deck fill lid, and to align with and work in cooperation with said first small pin of said handle to remove or re-install a deck fill lid;
      a second large pin mounted perpendicularly onto said second exterior surface of said slide body opposite said first exterior surface of said slide body, said second large pin designed and configured to engage a second large hole in a deck fill lid, and to align with and work in cooperation with said first large pin of said handle to remove or re-install a deck fill lid; and
   slidably mounting said slide over said handle.

8. The method of claim 7, further comprising providing a means to prevent said slide from sliding off of the aft end of said handle.

9. The method of claim 8, further comprising providing a slot head mounted perpendicularly onto said third exterior surface of said slide body, said slot head designed and configured to engage a slot in a deck fill lid to remove or re-install said deck fill lid.

10. The method of claim 7, further providing a drive nut mounted perpendicularly onto said fourth exterior surface of said slide body, said drive nut designed and configured to engage a socket receiver in a deck fill lid to remove or re-install said deck fill lid.

11. The method of claim 7, further providing one or more slots passing through said handle, said one or more slots designed and configured to engage the head of a shackle pin of a shackle to enable said universal adjustable deck fill lid key to function as a tool to loosen and/or tighten said shackle bolt.

* * * * *